Patented Aug. 19, 1952

2,607,758

UNITED STATES PATENT OFFICE 2,607,758

RESINOUS PRODUCT FROM FURFURAL

John C. Hillyer, Bartlesville, Okla., assignor to Phillips Petroleum Company, a corporation of Delaware No Drawing. Application November 22, 1948, Serial No. 61,530

8 Claims. (Cl. 260—67.5)

This invention relates to polymeric materials. In one aspect this invention relates to the manufacture of high molecular weight materials. In another aspect this invention relates to new polymeric materials prepared from a selected furfural.

It is well known that a furfural undergoes slow polymerization and resinification on exposure to air or oxygen. The change occurs slowly, and is only slightly accelerated by elevated temperatures. Resinous materials produced in this manner have found some uses in commerce but their production on an industrial scale is too slow to prove practicable.

It is possible to accelerate the conversion of a furfural to polymer by various means such as the addition of oxygen, hydrogen chloride, or strong sulfuric acid or caustic alkalis. Various disadvantages are inherent in the practice of these known methods. Degradative changes occur in the furfural, the nature of which is only partially understood, with the formation of oxidation products of equal or lower molecular weight. Thus a considerable portion of the furfural may be lost to non-resinous products. The presence of oxygen in the resinous product is also deleterious to the properties of the material, resulting in a more brittle product.

Hydrogen chloride, and certain metallic chlorides which are readily hydrolyzed, such as ferric chloride, strongly catalyze the conversion of furfurals to resinous materials. These reactions proceed extremely rapidly, often with nearly explosive violence, even in those cases wherein a very small quantity of the catalyst is employed, and it is therefore difficult to control the reaction, and the quantity of the product is variable and generally unsatisfactory so that such methods cannot be considered practical.

Acceleration of polymerization of furfurals with sulfuric acid, caustic solutions, etc. is generally more satisfactory, but also presents several disadvantages in its utilization. In the first place, considerable quantities of acid are required to carry out the condensation. This results in an uneconomical operation and adds a washing problem to the production of the resultant resinous product. Furthermore it appears that the sulfuric acid functions at least partially as a dehydrating agent in such a reaction, effecting the condensation through loss of water from the furfural. Thus the total resinous product obtained by methods of this type is always obtained in a quantity less than the weight of the furfural reacted.

I have now found an improved and novel procedure for converting selected furfurals into plastic resinous materials whereby many of the disadvantages of the prior art are avoided. Yields of polymer equal to or even exceeding the weight of the furfural consumed, are produced without the use of acid catalysts. The reaction is readily controlled and a product of good quality is produced.

An object of this invention is to provide for the manufacture of new high molecular weight materials.

Another object is to provide new and novel resinous materials.

Another object is to provide for the manufacture of new and novel resinous materials by condensation of a selected furfural with a selected morpholine.

Other objects will be apparent to those skilled in the art from the accompanying discussion and disclosure.

In accordance with the process of my invention furfural, or a homologue thereof, is reacted with a relatively minor proportion of the nitrogenous base morpholine, or selected derivatives of morpholine, at moderately elevated temperatures to produce high yields of a hard thermoplastic resin incorporating the morpholine as a component part of the resinous product. The morpholine added and consumed in the reaction is utilized in the formation of valuable resinous products and is not lost, as are acid or base accelerators when utilized in furfural resinification methods, heretofore employed. The morpholine reacted with the furfural in accordance with my invention, is selected from the group consisting of morpholine, monophenyl morpholine, monoalkyl morpholine, and dialkyl morpholine, the total number of carbon atoms in the selected morpholine not exceeding 10. Similarly the furfural reacted with a morpholine in accordance with my invention is selected from the group consisting of monoalkyl furfural, dialkyl furfural, monophenyl furfural and furfural, the total number of carbon atoms in the selected furfural not exceeding 12. The product forming step of my invention is conducted preferably in the liquid phase.

In a preferred embodiment of my invention, a furfural is heated with a minor amount of a selected morpholine for a sufficient period of time to effect the desired degree of condensation. At the end of the reaction period the resinous product is separated from the unreacted furfural, sometimes by mechanical means such as filtration, although it is more often preferable to remove the furfural by distillation, yielding the desired resinous product as a residue. The quantity of the morpholine used with the furfural may be varied over a wide range. Preferably, I employ the morpholine in a quantity of from about 0.5 to about 20 per cent by weight of the furfural although larger or smaller quantites may be used. More often I prefer to use a quantity of the selected morpholine of from 1 to 10 per cent by weight of the furfural reactant.

Elevated temperatures may be utilized to effect the condensation of this invention within a relatively short time. One convenient means of carrying out the reaction consists in refluxing the furfural-morpholine mixture at atmospheric pressure. The temperature in this instance varies from about 250 to 320° F., and in some cases higher, depending upon the specific morpholine and furfural selected and on the amount of the morpholine used. Periods of 24 to 48 hours at these conditions are sufficient for obtaining the maximum practicable yields of resinous products, although shorter periods may be used as desired with concomitantly lower yields of resinous product. Usually, when operating at a temperature below 320° F., a four hour period is the minimum desired reaction time. In some instances, when conducting the reaction for a period in excess of 48 hours, higher yields of resinous materials may be obtained. At temperatures below 320° F., the increase in yield, if any, obtained by extending the reaction time beyond 48 hours, is small. However, a more rapid polymerization may be readily accomplished by the use of temperatures higher than those discussed above. For example, the reaction may be carried out under moderate pressures, and under these conditions temperatures as high as 400–500° F. may be utilized. At such high temperatures, a pressure as high as 100 p. s. i. g. or higher is preferably applied, and high yields of resinous product are obtained in from 0.5 to 10 hours contact time, one hour often being sufficient. Temperatures above 500° F. and a pressure above 200 to 400 p. s. i. g. are usually not preferred.

Yields of resinous product based on the weight of the furfural reacted are usually from about 2 to about 60 per cent. The selected morpholine enters into the composition of the final resinous product. The weight of the resinous material produced from a given amount of the furfural is higher than that ordinarily obtained by the polymerization of the furfural alone, and often equals or even exceeds the amount of the furfural consumed. The yield of resinous product is generally found to be in the range of 3 to 10 times the weight of the morpholine reacted. Unreacted furfural is recovered and may be recycled.

The resinous materials of my invention are hard and tough. They are thermoplastic and may be melted and cast or molded when finely powdered. They are suitable for a variety of uses, where a hard, dark colored resin may be applied such as in insulating materials, panel boards, small shaped objects, rods, and the like. They may be increased in strength and toughness by the use of the usual fillers, etc. The condensations of my invention are not typical of those employing other nitrogen bases. Many nitrogen bases, on the contrary, act as inhibitors to furfural polymerization, even when certain accelerators are present. Thus, pyridine, alkyl pyridines, and quinolines when treated with furfural under similar conditions of temperature, and for a given length of time, result in the formation of substantially no polymer, in an amount even less than the very small amount formed when pure unaccelerated furfural is polymerized.

The mechanism by which resinous products of my invention are formed, is not entirely understood by me, nor is such understanding essential to the disclosure of, and the practice of my invention. While it is known that a primary amino group will react with an aldehyde such as furfural to produce a condensation product, the materials so formed are of low molecular weight and have a definite, and low, molal ratio of amine to aldehyde. Thus a 1:1 molal condensation may occur to yield the typical Schiff's base:

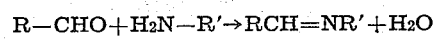

Alternatively a two to one condensation may occur, in which case a product of the formula

is produced. These substances can be isolated as pure materials, often crystaline or as liquids of definite boiling points. On the other hand, the resinous materials of my invention, produced with a morpholine and a furfural of the types already described, are polymeric materials of high molecular weight.

The condensation of my invention occurs in a ratio of at least 3 moles of the furfural to one of the morpholine, usually as high as from 4 to 10 moles of the furfural to one of the morpholine, which is not explainable from the basis of any simple reaction such as is shown in the above equations. Furthermore other components containing the primary amino group such as phenyl-α-naphthyl amine, do not undergo polymerization of the type shown by the morpholine. The following examples will serve to illustrate the results which may be obtained by the practice of my invention. It is to be understood that the examples are primarily for the purpose of illustration; the invention is not to be regarded as being unduly limited to the exact methods employed or the results obtained in any case.

Example 1

A sample of pure furfural was placed in each of 11 tubes. To two of the samples one per cent of morpholine was added. Two tubes were allowed to remain untreated to serve as controls, while to each of the remaining seven was added one per cent of another nitrogen compound. The tubes were then sealed and heated to 260° F. At the end of the heating period the tubes were opened, excess furfural distilled, and the residual resin recovered. Results of these tests are tabulated below.

| Additive | Length of Run (Hrs.) | Percent Yield of Resinous Products[1] | Remarks |
|---|---|---|---|
| Morpholine | 36 | 5.9 | No morpholine in furfural distillate. |
|  | 60 | 7.7 | Black thermoplastic resin obtained. |
| None | 36 | 0.23 |  |
| Do | 60 | 0.22 |  |
| Quinoline | 36 | 0.36 |  |
| Do | 60 | 0.51 |  |
| Pyridine | 36 | 0.26 | In each case amines were found in the distilled furfural. |
| Do | 60 | 0.27 |  |
| Phenyl-α-naphthylamine | 36 | 0.25 |  |
| Do | 60 | 0.33 |  |
| Do | 36 | 0.57 |  |

[1] Based on the weight of reacted furfural.

Example 2

A sample of pure furfural was heated with 5.0 weight per cent of morpholine by refluxing at atmospheric pressure. The boiling temperature was initially 285° F. This gradually decreased to 265° F. over a 36 hour period. After removal of the excess furfural, 20 per cent, based on total feed, of a black, hard, thermoplastic resinous product was obtained. The resinous product was melted at 350–400° F. and cast into shapes, and was also obtained as a powder. The product was dark colored, hard and brittle, could be scratched by a knife blade, and showed a conchoidal fracture. The product was very slightly soluble in alcohol and benzene and substantially insoluble in hexane, and was not appreciably soluble in dilute mineral acid or sodium hydroxide.

Example 3

The run of Example 2 was repeated, the reaction being carried out in a pressure type reactor at a temperature of 400° F. under a pressure of 140 pounds per square inch gauge. After two hours time the reaction mixture was removed from the reactor and after distillation of unchanged furfural, provided a yield of thermoplastic resin amounting to 25 weight per cent of the furfural reacted. The properties of the resin were similar to those of the product obtained in Example 2.

As will be evident to those skilled in the art, various modifications can be made or followed in the light of the foregoing discussion and disclosure, without departing from the spirit or scope of the disclosure or from the scope of the claims.

I claim:

1. A process for the manufacture of a hard thermoplastic resinous material comprising heating an admixture consisting of furfural containing from 1 to 10 per cent of its weight of morpholine at a temperature within the range of 250–320° F. for a duration of from 24 to 48 hours under refluxing conditions, and recovering said thermoplastic resinous material from the resulting reaction mixture as a product of the process.

2. A process for the manufacture of a thermoplastic resinous material, comprising forming an admixture consisting of furfural with from 1 to 10 per cent of its weight of morpholine, and reacting furfural with morpholine in the resulting admixture at a temperature within the range of 320–500° F. and at a pressure within the range of 100–400 p. s. i. g. for a period of from 0.5 to 10 hours, and recovering a thermoplastic resinous material from the resulting reaction mixture as a product of the process.

3. A process for the preparation of a thermoplastic resinous material comprising heating an admixture consisting of furfural containing from 0.5 to 20 per cent of its weight of morpholine at a temperature within the range of 200–500° F. for a period of from 1–48 hours, and recovering said resinous material from the resulting reaction admixture as a product of the process.

4. The process of claim 3 wherein said temperature is in the range of 250–320° F. and the duration of said reaction period is at least 4 hours.

5. The process of claim 3 wherein said temperature is 320–500° F.

6. The process of claim 5 wherein said admixture is maintained under a pressure of from 100–400 p. s. i. g., and the duration of said period is from 0.5 to 10 hours.

7. A resinous product of the process of claim 3.

8. A resinous product of claim 7 containing from 3 to 10 molar equivalents of said furfural per molar equivalent of said morpholine.

JOHN C. HILLYER.

REFERENCES CITED

The following references are of record in the file of this patent:

UNITED STATES PATENTS

| Number | Name | Date |
|---|---|---|
| 2,345,966 | Fiedler | Apr. 4, 1944 |
| 2,362,086 | Myers | Nov. 7, 1944 |
| 2,369,948 | D'Alelio | Feb. 20, 1945 |
| 2,396,894 | Simons | Mar. 19, 1946 |

FOREIGN PATENTS

| Number | Country | Date |
|---|---|---|
| 575,114 | Germany | Apr. 24, 1933 |

OTHER REFERENCES

Rice, Jour. Amer. Chem. Soc., vol. 69, pages 1798–1800, July 1947.